United States Patent
Ichikawa (10) Patent No.: US 9,535,633 B2
(45) Date of Patent: Jan. 3, 2017

(54) IMAGE FORMING DEVICE, SERVER, AND IMAGE FORMING SYSTEM

(71) Applicant: BROTHER KOGYO KABUSHIKI KAISHA, Nagoya-shi, Aichi-ken (JP)

(72) Inventor: Kazuki Ichikawa, Gamagori (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 797 days.

(21) Appl. No.: 13/663,840

(22) Filed: Oct. 30, 2012

(65) Prior Publication Data

US 2013/0111045 A1 May 2, 2013

(30) Foreign Application Priority Data

Oct. 31, 2011 (JP) .................. 2011-238460

(51) Int. Cl.
*G06F 15/16* (2006.01)
*G06F 3/12* (2006.01)
(Continued)

(52) U.S. Cl.
CPC .......... *G06F 3/1204* (2013.01); *G06F 3/1222* (2013.01); *G06F 3/1236* (2013.01); *G06F 3/1238* (2013.01); *G06F 3/1288* (2013.01); *G06F 21/608* (2013.01); *H04L 67/143* (2013.01); *G06F 3/1231* (2013.01); *G06F 3/1287* (2013.01)

(58) Field of Classification Search
CPC .... G06F 3/1204; G06F 3/1212; G06F 3/1222; G06F 3/1236; G06F 3/1238; G06F 3/1288; G06F 21/608; G06F 3/1228; G06F 3/1267; G06F 3/1287; G06Q 20/0453; H04L 63/08; H04L 63/083; H04L 67/02; H04L 67/42; H04L 67/143; H04L 51/24; H04L 51/063; H04L 12/2807; H04N 1/00
See application file for complete search history.

(56) References Cited

U.S. PATENT DOCUMENTS 7,408,659 B2 * 8/2008 Toda et al. .................. 358/1.15
2002/0015185 A1 * 2/2002 Onishi et al. ............... 358/1.16
(Continued)

FOREIGN PATENT DOCUMENTS

CN 1469277 A 1/2004
CN 1825274 A 8/2006
(Continued)

OTHER PUBLICATIONS

European Search Report issued in EP 12190191.2, mailed Mar. 13, 2014.
(Continued)

*Primary Examiner* — Sargon Nano
*Assistant Examiner* — Michael Li
(74) *Attorney, Agent, or Firm* — Merchant & Gould P.C.

(57) ABSTRACT

An image forming device is provided that includes a first establishment unit configured to establish a connection with a server, a termination unit configured to terminate the connection with the server established by the first establishment unit, a detector configured to detect a connection request issued by the server, and a second establishment unit configured to establish a connection with the server in response to the detector detecting the connection request issued by the server.

10 Claims, 8 Drawing Sheets

(51) Int. Cl.
G06F 21/60 (2013.01)
H04L 29/08 (2006.01)

(56) References Cited

U.S. PATENT DOCUMENTS

| | | | |
|---|---|---|---|
| 2004/0218213 | A1 | 11/2004 | Shimizu et al. |
| 2005/0105127 | A1* | 5/2005 | Miwa et al. ............... 358/1.15 |
| 2008/0278751 | A1* | 11/2008 | Moyer et al. ............... 358/1.15 |
| 2009/0168114 | A1* | 7/2009 | Nishimura ............ H04L 51/063 |
| | | | 358/402 |
| 2009/0307359 | A1 | 12/2009 | Akita et al. |
| 2011/0235085 | A1* | 9/2011 | Jazayeri et al. ............ 358/1.14 |

FOREIGN PATENT DOCUMENTS

| | | |
|---|---|---|
| EP | 1 056 247 A2 | 11/2000 |
| EP | 1 056 247 A3 | 10/2009 |
| JP | 2003-330686 A | 11/2003 |
| JP | 2009-296473 A | 12/2009 |

OTHER PUBLICATIONS

Notification of Reasons of Rejection, issued in related Japanese Application No. 2011-238460, mailed Feb. 24, 2015.
Office Action issued in related Chinese Application No. 201210428098.1, mailed May 5, 2015.

* cited by examiner

| PRINTER NAME | IP ADDRESS | GROUP ACCOUNT INFORMATION | CONNECTION REQUEST | SIGN-IN |
|---|---|---|---|---|
| PRINTER A | 192.168.0.1 | ACCOUNT A | ON | ON |
| PRINTER B | 192.168.0.10 | ACCOUNT B | ON | OFF |
| PRINTER C | 192.168.0.100 | ACCOUNT C | OFF | OFF |

| GROUP ACCOUNT NAME | PASSWORD | USER ACCOUNT INFORMATION | | | |
|---|---|---|---|---|---|
| ACCOUNT A | **** | USER a1 | USER a2 | USER a3 | USER a4 |
| ACCOUNT B | **** | USER b1 | USER b2 | USER b3 | |
| ACCOUNT C | **** | USER c1 | | | |

| USER ACCOUNT NAME | PASSWORD |
|---|---|
| USER a1 | **** |
| USER a2 | **** |
| USER a3 | **** |

IMAGE FORMING DEVICE, SERVER, AND IMAGE FORMING SYSTEM

CROSS-REFERENCE TO RELATED APPLICATION

This application claims priority under 35 U.S.C. §119 from Japanese Patent Application No. 2011-238460 filed on Oct. 31, 2011. The entire subject matter of the application is incorporated herein by reference.

BACKGROUND

Technical Field

The following description relates to one or more techniques for an image forming system that includes a server and an image forming device configured to establish a connection with the server and perform printing in the state connected with the server.

Related Art

An image forming system has been known that includes a server and an image forming device, which is configured to establish a connection with the server and perform printing under the condition that the connection therebetween is maintained.

As an example of the known image forming system, a technique has been known in which when performing a copying operation with a multi-function peripheral (MFP), a user reads out identification data of the user's ID card, sends the read identification data to a print limiting server to perform authentication, and issues an instruction to start the copying operation at any moment after completion of the authentication. Further, in the exemplary known technique, the MFP notifies the print limiting server of logout after a lapse of a predetermined time period since completion of the copying operation.

SUMMARY

However, the known technique has the following problem. That is, when the image forming device terminates the connection with the server, the user is not allowed to use the image forming device until the user reestablishes the connection. Nevertheless, the connection between the server and the image forming device requires user's efforts such as operations of reading the ID card and entering account information.

Aspects of the present invention are advantageous to provide one or more improved techniques that make it possible to reduce user's efforts required for reestablishing connection between a server and an image forming device after termination of the connection.

According to aspects of the present invention, an image forming device is provided that includes a first establishment unit configured to establish a connection with a server, a termination unit configured to terminate the connection with the server established by the first establishment unit, a detector configured to detect a connection request issued by the server, and a second establishment unit configured to establish a connection with the server in response to the detector detecting the connection request issued by the server.

According to aspects of the present invention, further provided is a server that includes an establishment unit configured to establish a connection with an image forming device, a termination unit configured to terminate the connection with the image forming device in response to receipt of a termination request from the image forming device, a storage unit configured to store device information for identifying the image forming device, an acceptance unit configured to accept a print-related request, and an issuance unit configured to issue a connection request to the image forming device based on the device information stored in the storage unit, in response to the acceptance unit accepting the print-related request.

According to aspects of the present invention, further provided is an image forming system that includes an information processing device, an image forming device, and a server configured to communicate with the information processing device and the image forming device, the server being configured to receive print data from the information processing device and transmit the received print data to the image forming device. The image forming device includes a first establishment unit configured to issue a request for connection establishment to the server, and establish a connection with the server, a termination unit configured to issue a termination request to the server, and terminate the connection with the server established by the first establishment unit, a transmission unit configured to transmit, to the server, device information for identifying the image forming device, before the termination unit terminates the connection with the server after the first establishment unit issues the request for connection establishment to the server, a detector configured to detect a connection request issued by the server, and a second establishment unit configured to establish a connection with the server in response to the detector detecting the connection request issued by the server. The server includes a server-side establishment unit configured to establish a connection with the image forming device in response to acceptance of the request for connection establishment from the image forming device, a server-side termination unit configured to terminate the connection with the image forming device in response to acceptance of the termination request from the image forming device, a server-side storage unit configured to receive and store the device information for identifying the image forming device that is transmitted by the image forming device, before the server-side termination unit terminates the connection with the image forming device after the server-side establishment unit accepts the request for connection establishment from the image forming device, a server-side acceptance unit configured to accept a print-related request via the information processing device, and a server-side issuance unit configured to issue the connection request to the image forming device based on the device information stored in the server-side storage unit, in response to the server-side acceptance unit accepting the print-related request.

According to aspects of the present invention, further provided is an image forming device that includes a first establishment unit configured to accept an entry of information for establishing a connection with a server, and establish the connection with the server using the accepted information, a termination unit configured to terminate the connection with the server established by the first establishment unit, a transmission unit configured to transmit to the server the information for establishing the connection, before the termination unit terminates the connection with the server, a detector configured to detect a connection request issued by the server, and a second establishment unit configured to, in response to the detector detecting the connection request issued by the server after the termination unit terminates the connection with the server, acquire the information for establishing the connection from the detected connection request, and reestablish the terminated connection using the acquired information.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described in detail with reference to the accompanying drawings. In the embodiment, aspects of the present invention are applied to an image forming system that includes a cloud server configured to store print data, a printer having a print function, and a personal computer (PC) configured to create a print job. It is noted that the cloud server is a virtual server beyond a cloud in a concept of cloud computing. Further, the cloud server is configured to be operated on a WEB browser by letting packets pass through the cloud.

[Configuration of Cloud Printing System]

Figure 1:
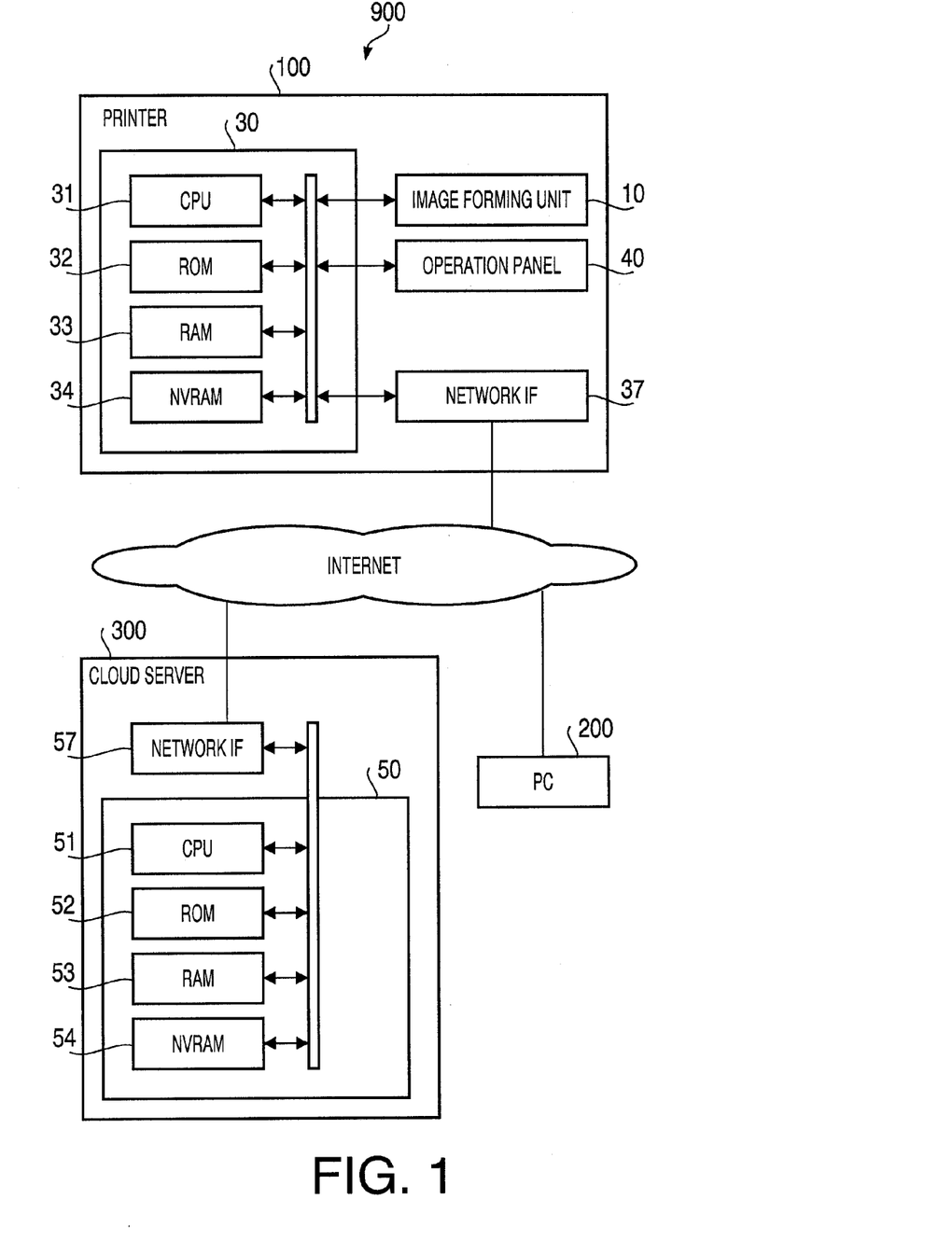
FIG. 1 is a block diagram schematically showing a configuration of an image forming system and electrical configurations of a printer and a cloud server in an embodiment according to one or more aspects of the present invention.

As shown in FIG. 1, a image forming system 900 of the embodiment includes a printer 100, a PC 200, and a cloud server 300. The cloud server 300 is configured to store a print job output from the PC 200 and transmit the stored print job to the printer 100.

In the image forming system 900, the PC 200 is required to establish a communication connection with the cloud server 300 in order to transmit a print job to the cloud server 300. Further, the printer 100 is required to establish a communication connection with the cloud server 300 in order to acquire print data from the cloud server 300. It is noted that a state where the communication connection is established contains not only a physically connected state but also a state where the cloud server 300 permits communication with the PC 200 or the printer 100.

An operation for the PC 200 to establish a communication connection with the cloud server 300 will be referred to as "login." Further, an operation for the PC 200 to terminate the communication connection will be referred to as "logout." In addition, an operation for the printer 100 to establish a communication connection with the cloud server 300 will be referred to as "sign-in." Furthermore, an operation for the printer 100 to terminate the communication connection will be referred to as "sign-out."

It is noted that there may be one or more image forming devices connected with the cloud server 300 other than the printer 100. However, FIG. 1 shows only the printer 100 as an example of the image forming devices connected with the cloud server 300 for the sake of simplified explanation. Further, there may be one or more information processing devices connected with the cloud server 300 other than the PC 200. However, FIG. 1 shows only the PC 200 as an example of the information processing devices connected with the cloud server 300 for the sake of simplified explanation.

[Configuration of Printer]

As shown in FIG. 1, the printer 100 of the embodiment includes a controller 30 that includes a CPU 31, a ROM 32, a RAM 33, and a non-volatile RAM (NVRAM) 34. Further, the controller 30 is electrically connected with an image forming unit 10 configured to form an image on a sheet, an operation panel 40 configured to display an operational status and accept an input operation from a user, and a network interface 37.

The ROM 32 stores control programs (firmware) for controlling the printer 100, and various settings and initial values. The RAM 33 and the NVRAM 34 are utilized as work areas for loading various control programs thereinto or storage areas for temporarily storing the print data.

The CPU 31 is configured to control elements included in the printer 100 while storing processing results into the RAM 33 or the NVRAM 34 in accordance with the control programs read out from the ROM 32 and/or signals received from various sensors.

The network interface 37 is an interface for achieving communication with other devices. The printer 100 receives the print job or various requests from the cloud server 300 via the network interface 37.

The image forming unit 10 may be configured to form an image on a sheet in any of image forming methods such as an electrophotographic method and an inkjet method. In addition, the image forming unit 10 may be configured to perform color printing or may be designed only for monochrome printing. In the embodiment, the image forming unit 10 is configured to perform electrographic color printing.

The operation panel 40 includes various buttons for accepting user operations, and a touch panel screen configured to display various kinds of information such as textual information and buttons. The various buttons of the operation panel 40 include an OK button for providing an instruction to start a printing operation and a cancel button for providing an instruction to cancel the printing operation. Further, the operation panel 40 is configured to accept an input operation for signing in or signing out.

[Configuration of Cloud Server]

As shown in FIG. 1, the cloud server 300 of the embodiment includes a controller 50 that includes a CPU 51, a ROM 52, a RAM 53, and a non-volatile RAM (NVRAM) 54. Further, the controller 50 is electrically connected with a network interface 57.

The ROM 52 stores processing programs configured to perform various kinds of processing for the print data, and various settings and initial values. The RAM 53 and the NVRAM 54 are utilized as work areas for loading various processing programs thereinto or storage areas for temporarily storing the print data.

The CPU 51 is configured to perform a processing operation of processing the print data while storing processing results into the RAM 53 or the NVRAM 54 in accordance with the processing programs read out from the ROM 52.

The network interface 57 is an interface for achieving communication with other devices. The cloud server 300 receives, via the network interface 57, various requests transmitted from the printer 100 or the print job transmitted from the PC 200.

Figure 2:
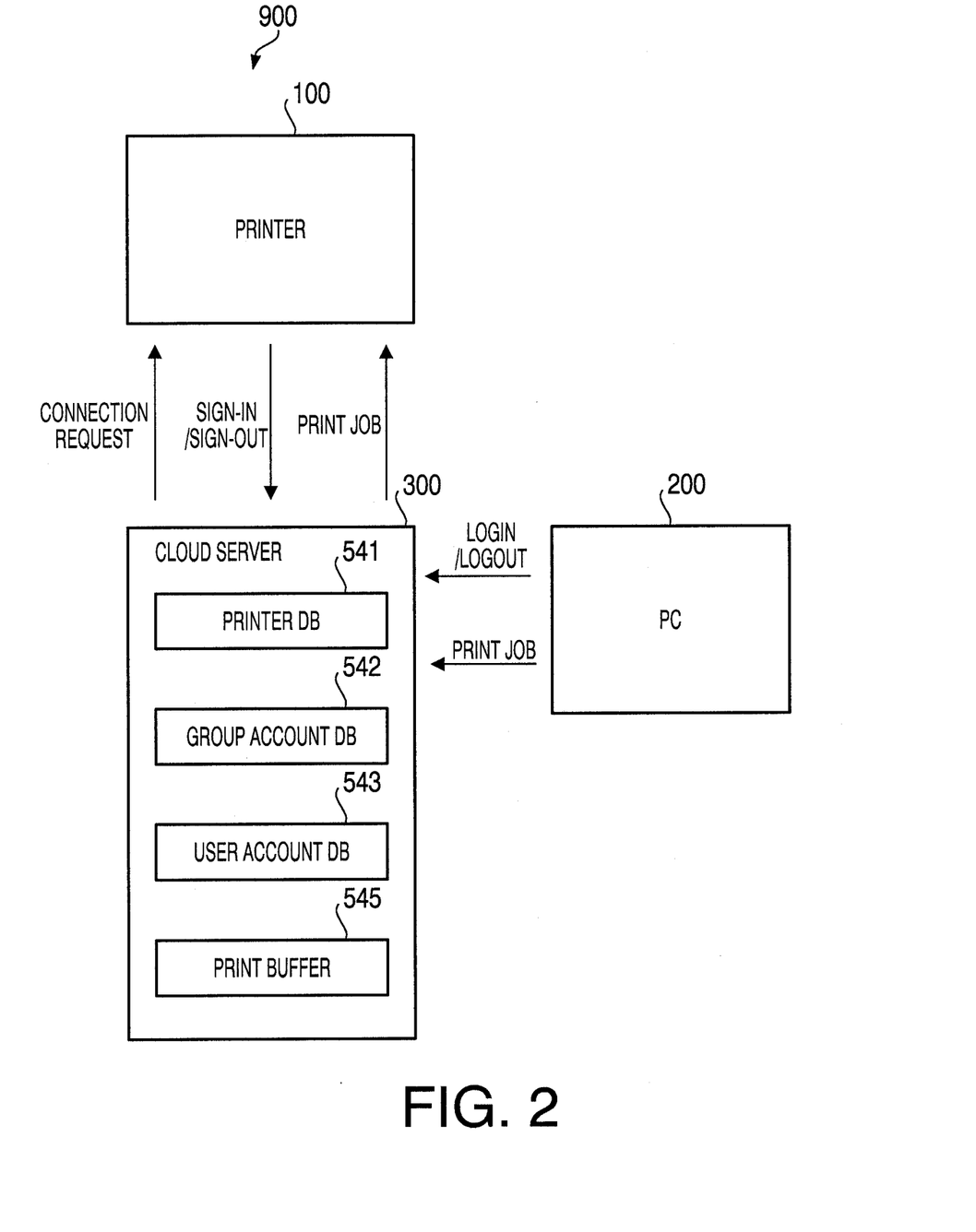
FIG. 2 is a block diagram schematically showing operations of the image forming system in the embodiment according to one or more aspects of the present invention.

As shown in FIG. 2, the cloud server 300 has a database for storing information on the printer 100 (hereinafter referred to as a "printer DB 541"), a database for storing information on group accounts (hereinafter referred to as a "group account DB 542"), a database for storing information on user accounts (hereinafter referred to as a "user account DB 543"), and a print buffer 545 for storing the print job received from the PC 200. The printer DB 541, the group account DB 542, the user account DB 543, and the print buffer 545 are in a storage device (such as the RAM 53 and the NVRAM 54) of the cloud server 300.

Figure 3:
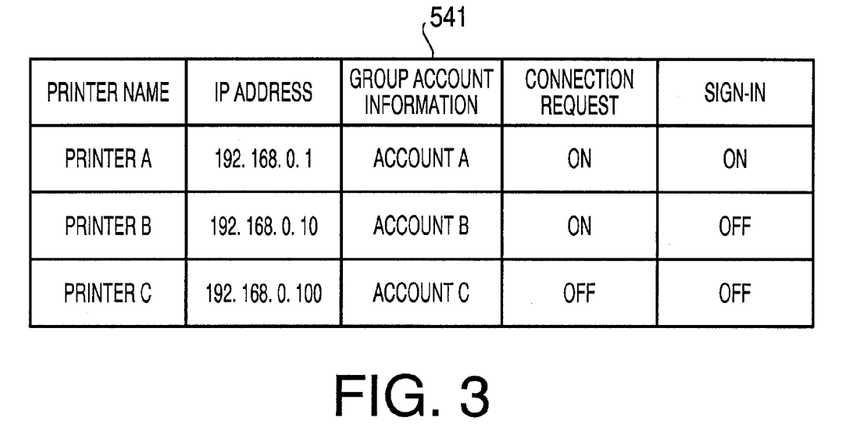
FIG. 3 schematically shows a configuration of a database (printer DB) of the cloud server for storing information on printers in the embodiment according to one or more aspects of the present invention.

As shown in FIG. 3, the printer DB 541 is configured to store the information on the printer 100 as a single record that includes information items such as a "printer name," an "IP address," "group account information," a "connection request," and a "sign-in." The IP address is information representing an address of the printer 100. The group account information is configured to store a group account that has signed in on the cloud server 300. The item "connection request" is configured to store information as to whether to allow the cloud server 300 to issue a request for connection (a connection request) to the printer 100. When the value of the "connection request" is "ON," the cloud server 300 is allowed to issue the connection request to the printer 100. Meanwhile, when the value of the "connection request" is "OFF," the cloud server 300 is not allowed to issue the connection request to the printer 100. The item "connection request" will be described in detail later. The item "sign-in" is configured to store information as to whether the communication connection is established between the printer 100 and the cloud server 300. When the value of the "sign-in" is "ON," the communication connection is established between the printer 100 and the cloud server 300. Meanwhile, when the value of the "sign-in" is "OFF," the communication connection is not established.

Figure 4:
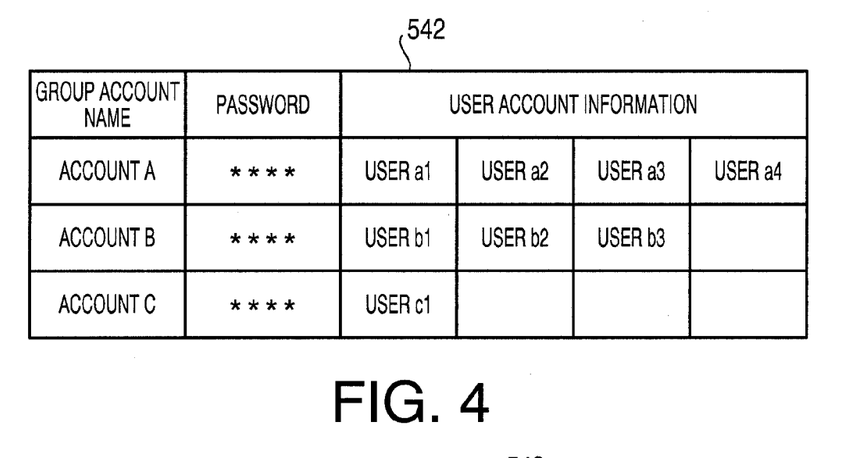
FIG. 4 schematically shows a configuration of a database (group account DB) of the cloud server for storing information on group accounts in the embodiment according to one or more aspects of the present invention.

Further, as shown in FIG. 4, the group account DB 542 is configured to store the information on the group account as a single record that includes a group account name, a password, and information on a user account belonging to the group account. The group account DB 542 is used in an authentication process to be executed when the cloud server 300 receives a sign-in request from the printer 100. It is noted that a user account may belong to not only a single group account but also one or more other group accounts.

Figure 5:
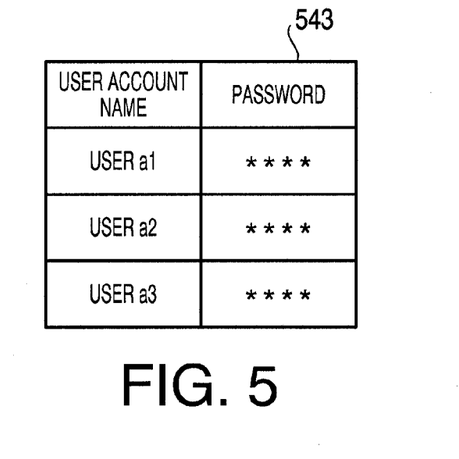
FIG. 5 schematically shows a configuration of a database (user account DB) of the cloud server for storing information on user accounts in the embodiment according to one or more aspects of the present invention.

Further, as shown in FIG. 5, the user account DB 543 is configured to store the information on the user account as a single record that includes a user account name and a password. The user account DB 543 is used in an authentication process to be executed when the cloud server 300 receives a login request from the PC 200.

[Overview of Operations of Cloud Printing System]

Subsequently, an overview of operations of the image forming system 900 will be described with reference to FIG. 2. In order to carry out printing with the image forming system 900, it is required to previously establish both a communication connection between the printer 100 and the cloud server 300 and a communication connection between the PC 200 and the cloud server 300.

Firstly, in the sign-in for establishing the communication connection between the printer 100 and the cloud server 300, the user enters a group account and a password for the group account in the printer 100. Then, when the cloud server 300 certificates the group account, the communication connection between the printer 100 and the cloud server 300 is established.

When the communication connection is established between the printer 100 and the cloud server 300, the cloud server 300 stores into the printer DB 541 the information on the printer 100 which is a connection destination of the cloud server 300.

When establishing the communication connection with the cloud server 300, that is, successfully signing in on the cloud server 300, the printer 100 begins to periodically issue a transmission request to the cloud server 300. The periodically-issued transmission request requests the cloud server 300 to transmit a print job to the printer 100 when the cloud server 300 receives the print job from a user belonging to the group account with which the sign-in has been achieved. The printer 100 receives the print job that is transmitted by the cloud server 300 in response to the transmission request, and performs printing based on the print job.

Meanwhile, in the login for establishing the communication connection between the PC 200 and the cloud server 300, the user enters a user account and a password for the user account in the PC 200. Then, when the cloud server 300 certificates the user account, the communication connection between the PC 200 and the cloud server 300 is established.

When the communication connection is established between the PC 200 and the cloud server 300, that is, the login is successfully achieved, the print job is allowed to be transmitted from the PC 200 to the cloud server 300. The transmitted print job is once stored in the print buffer 545 of the cloud server 300. Then, when the printer 100 issues the transmission request to the cloud server 300, the print job is transmitted to the printer 100, such that the printer 100 performs printing based on the print job.

[Control of Image Forming System]

[Sign-In]

Subsequently, an explanation will be provided about an operational procedure of each device to achieve the aforementioned operations of the image forming system 900. Firstly, operations to be executed when the printer 100 signs in on the cloud server 300 will be described with reference to FIG. 6.

Figure 6:
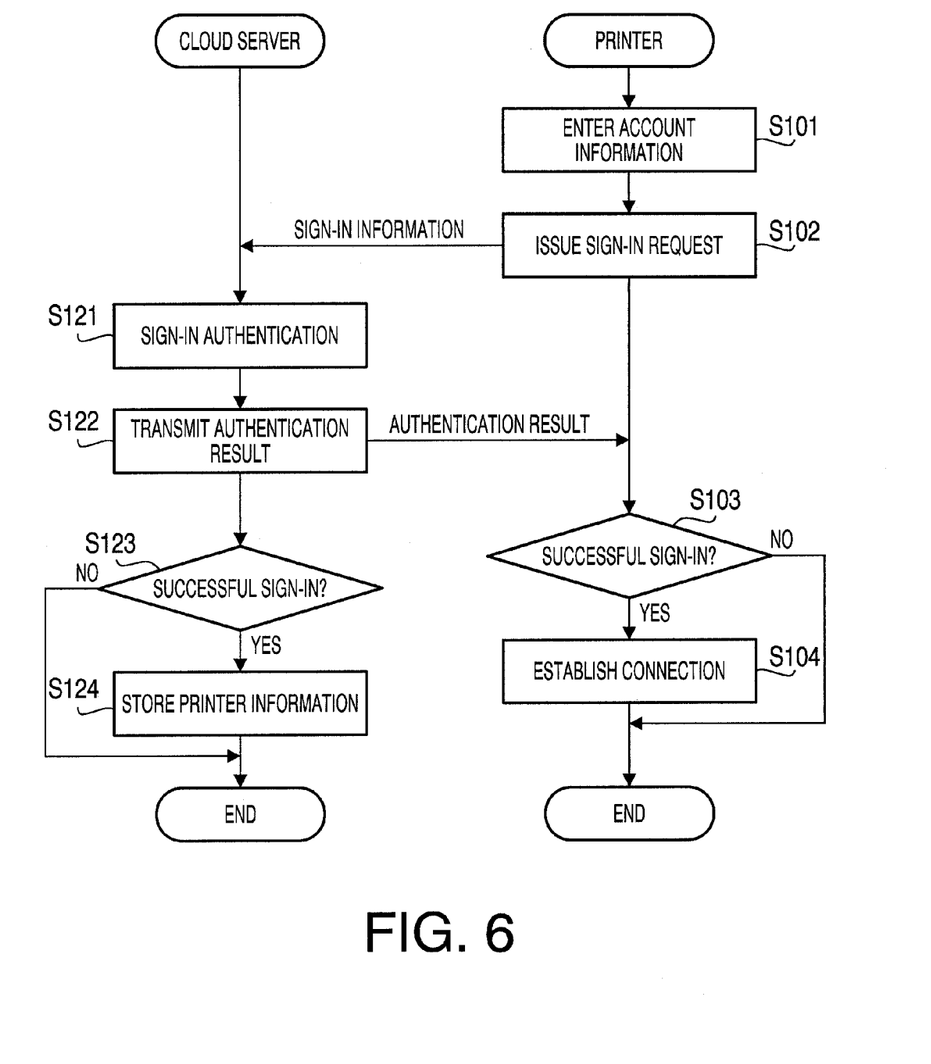
FIG. 6 is a flowchart showing a procedure of operations to be executed when the printer signs in on the cloud server in the image forming system of the embodiment according to one or more aspects of the present invention.

When the printer 100 signs in to establish the communication connection with the cloud server 300, firstly the user operates the operation panel 40 of the printer 100 to enter account information for signing in on the cloud server 300 (S101). The account information entered in S101 contains the group account and the password associated with the group account.

After accepting the account information entered, the printer 100 issues a sign-in request to the cloud server 300 (S102). It is noted that sign-in information, which includes the account information entered in S101 and printer information on the printer 100, is added to the sign-in request. Additionally, the printer information contains the printer name and the IP address of the printer 100.

Upon receiving the sign-in request, the cloud server 300 performs an account authentication operation (sign-in authentication) based on the account information included in the sign-in information (S121). Specifically, when determining that the group account DB 542 stores a record of the group account entered by the user, and that the password entered by the user is coincident with a password stored in the record, the cloud server 300 permits the sign-in with the group account. Meanwhile, when determining that the group account DB 542 does not store a record of the entered group account, or that the entered password is not coincident with a password stored in the record, the cloud server 300 does not permit the sign-in with the group account.

After the account authentication operation to authenticate the entered group account in S121, the cloud server 300 transmits the result of the account authentication operation to the printer 100 (S122). Upon receiving the result of the account authentication operation from the cloud server 300, the printer 100 determines whether the sign-in is permitted, that is, whether the sign-in has successfully been achieved (S103).

When determining that the sign-in is permitted (S103: Yes), the printer 100 is placed into a state where the communication connection is established with the cloud server 300 (S104). After establishing the communication connection with the cloud server 300, the printer 100 begins to periodically issue the transmission request that requests the cloud server 300 to transmit a print job to the printer 100. Meanwhile, when determining that the sign-in is not permitted (S103: No), the printer 100 does not establish the communication connection with the cloud server 300.

Meanwhile, after transmitting the result of the account authentication operation in S122, the cloud server 300 determines whether the cloud server 300 has permitted the sign-in requested by the printer 100 (S123). When determining that the cloud server 300 has permitted the sign-in requested by the printer 100 (S123: Yes), the cloud server 300 stores, into the printer DB 541, information on the printer 100 based on the account information and the printer information included in the sign-in information (S124). It is noted that an initial value "ON" is stored in each item of the "connection request" and the "sign-in," among the items stored in the printer DB 541. In addition, when there is information on the printer 100 already stored in the printer DB 541, the group account information is updated, and each value of the "connection request" and the "sign-in" is initialized to "ON." Meanwhile, when determining that the cloud server 300 has not permitted the sign-in requested by the printer 100 (S123: No), the cloud server 300 does not store any information on the printer 100 into the printer DB 541.

[Login]

Subsequently, operations to be executed when the PC 200 logs in to the cloud server 300 will be described with reference to FIG. 7.

When the PC 200 logs in to establish the communication connection with the cloud server 300, firstly the user operates the PC 200 to enter account information for logging in to the cloud server 300 (S201). The account information entered in S201 contains the user account and the password associated with the user account.

After accepting the account information entered, the PC 200 issues a login request to the cloud server 300 (S202). It is noted that login information, which includes the account information entered in S201, is added to the login request.

Upon receiving the login request, the cloud server 300 performs a login authentication operation based on the account information included in the login information (S221). Specifically, when determining that the user account DB 543 stores a record of the user account entered by the user, and that the password entered by the user is coincident with a password stored in the record, the cloud server 300 permits the login with the user account. Meanwhile, when determining that the user account DB 543 does not store a record of the entered user account, or that the entered password is not coincident with a password stored in the record, the cloud server 300 does not permit the login with the group account.

After the login authentication operation to authenticate the entered user account in S221, the cloud server 300 transmits the result of the login authentication operation to the PC 200 (S222). Upon receiving the result of the login authentication operation from the cloud server 300, the PC 200 determines whether the login is permitted, that is, whether the login has successfully been achieved (S203).

When determining that the login is permitted (S203: Yes), the PC 200 is placed into a state where the communication connection is established with the cloud server 300 (S204). After establishing the communication connection with the cloud server 300, the PC 200 is allowed to transmit the print job to the cloud server 300. Meanwhile, when determining that the login is not permitted (S203: No), the PC 200 does not establish the communication connection with the cloud server 300.

Meanwhile, after transmitting the result of the login authentication operation in S222, the cloud server 300 determines whether the cloud server 300 has permitted the login requested by the PC 200 (S223). When determining that the cloud server 300 has permitted the login requested by the PC 200 (S223: Yes), the cloud server 300 extracts printers available with the permitted user account (S224). Specifically, the cloud server 300 refers to the group account DB 542 to extract group accounts to which the permitted user account belongs, and further refers to the printer DB 542 to extract all printers associated with the extracted group accounts. Here, the cloud server 300 may extract one or more printers.

Next, the cloud server 300 excludes one or more printers which have already signed in on the cloud server 300 from the extracted printers (S225). Namely, since the cloud server 300 needs not issue the connection request to the printers which have already signed in on the cloud server 300, the cloud server 300 excludes the printers which have already signed in on the cloud server 300 from the printers to which the cloud server 300 is to issue the connection request.

Further, the cloud server 300 excludes one or more printers to which the cloud server 300 is forbidden to issue the connection request, that is, one or more printers for which the value of the item "connection request" is "OFF" (S226). After that, the cloud server 300 issues, to each remaining printer, the connection request that requests the printer to issue the sign-in request (S227). The connection request has the account information added thereto that includes the group account and the password associated with the group account.

Upon receipt of the connection request, the printer 100 signs in on the cloud server 300 using the account information added to the connection request (S241). The sign-in process executed in S241 is the same as the steps S101 to S104 of the flowchart shown in FIG. 6. In this respect, however, it is noted that the account information acquired in S241 is not the account information entered by the user but the account information added to the connection request.

Meanwhile, after issuing the connection request, the cloud server 300 performs a sign-in authentication process using the sign-in information received from the printer 100 (S228). The sign-in authentication process executed in S228 is the same as the steps S121 to S124 of the flowchart shown in FIG. 6.

When the cloud server 300 has not permitted the login requested by the PC 200 (S223: No), the cloud server 300 is not allowed to accept a print instruction from the PC 200. Therefore, the cloud server 300 does not perform S224 and the subsequent steps.

As described above, in the login operation of the image forming system 900, when a printer (in the embodiment, the printer 100) available with the user account used for the login is not in a sign-in state (where the printer has signed in on the cloud server 300), the cloud server 300 issues, to the printer 100, the connection request that requests the printer 100 to sign in on the cloud server 300. Then, in response to the connection request, the printer 100 signs in on the cloud server 300. Thus, even though the printer 100 is in a sign-out state (where the printer 100 has signed out from the cloud server 300) when the user logs in to the cloud server 300, the user is allowed to utilize the printer 100 without having to make the printer 100 sign in on the cloud server 300.

[Transmission of Print Job]

In the embodiment, as described above, the cloud server 300 issues the connection request to the printer which is in the sign-out state, when the user logs in to the cloud server 300. However, the cloud server 300 may issue the connection request to the printer which is in the sign-out state, at a different time. Hereinafter, an explanation will be provided about operations to be executed when the cloud server 300 issues the connection request in the case where the print job is transmitted from the PC 200 to the printer 100 via the cloud server 300, with reference to FIG. 8. It is noted that the same operations as executed at the time of login will be provided with the same reference characters, and explanations about them will be omitted.

In advance of transmission of the print job, firstly, the PC 200 logs in to the cloud server 300 (S200). The login process executed in S200 is the same as the steps S201 to S204 of the flowchart shown in FIG. 7.

Meanwhile, when accepting the login request, the cloud server 300 performs a login authentication process (S220). The login authentication process executed in S220 is the same as the steps S221 to S222 of the flowchart shown in FIG. 7. At this stage, the cloud server 300 does not issue the connection request to any printer.

After that, the PC 200 accepts a print instruction and transmits a print job to the cloud server 300 (S305; issuance of a print request). The print job has various kinds of information added thereto such as print data to be printed, printer settings, and user account information.

Meanwhile, after receiving the print job, the cloud server 300 stores the print job in the print buffer 545 and extracts one or more printers specified by the print job (S224). Then, the cloud server 300 excludes, from the extracted printers, one or more printers which have already signed in on the cloud server 300 (S225), and further exclude one or more printers to which the cloud server 300 is forbidden to issue the connection request (S226). After that, the cloud server 300 issues, to each remaining printer, the connection request that requests the printer to issue the sign-in request (S227).

Figure 7:
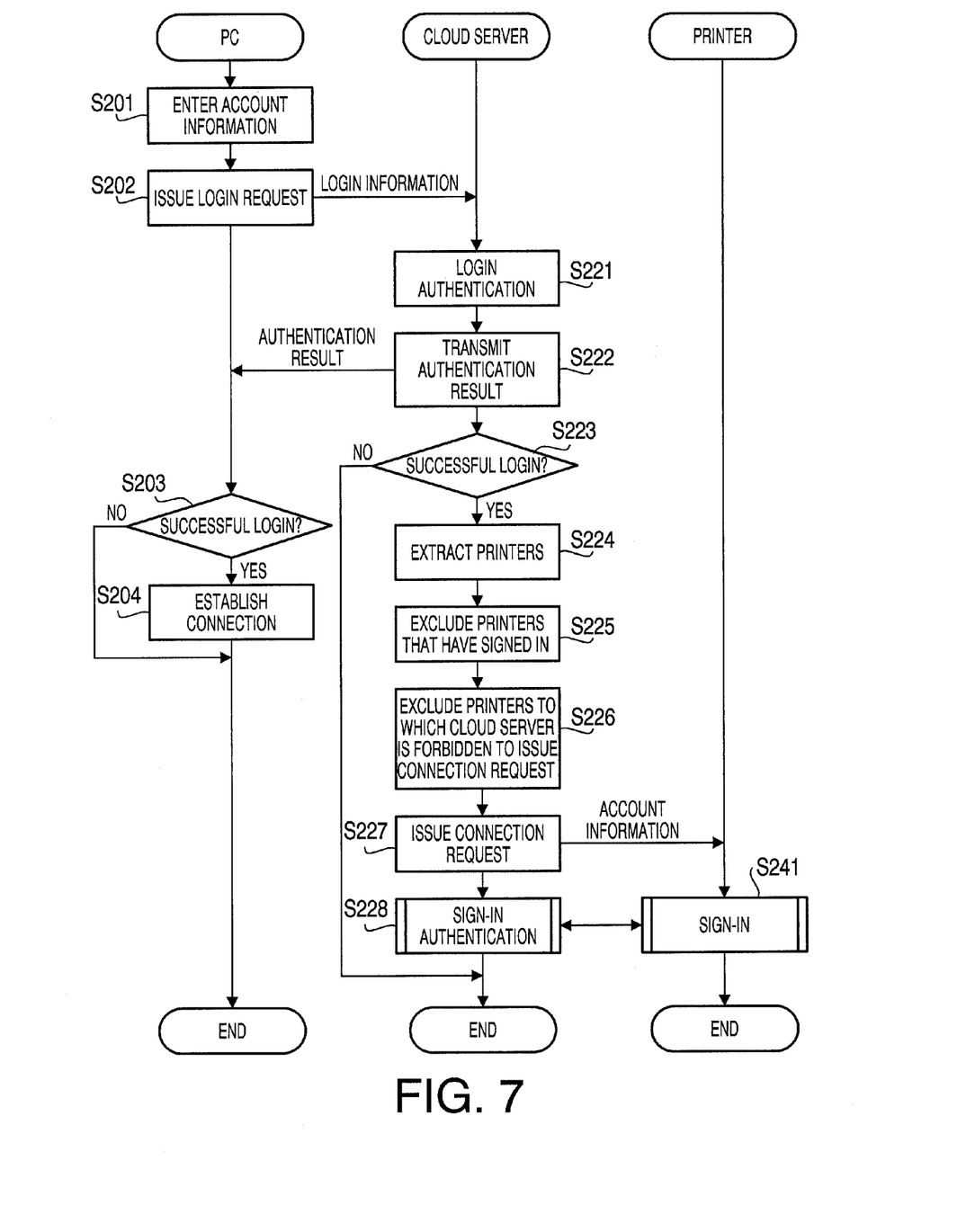
FIG. 7 is a flowchart showing a procedure of operations to be executed when a personal computer (PC) logs in to the cloud server in the image forming system of the embodiment according to one or more aspects of the present invention.
Figure 8:
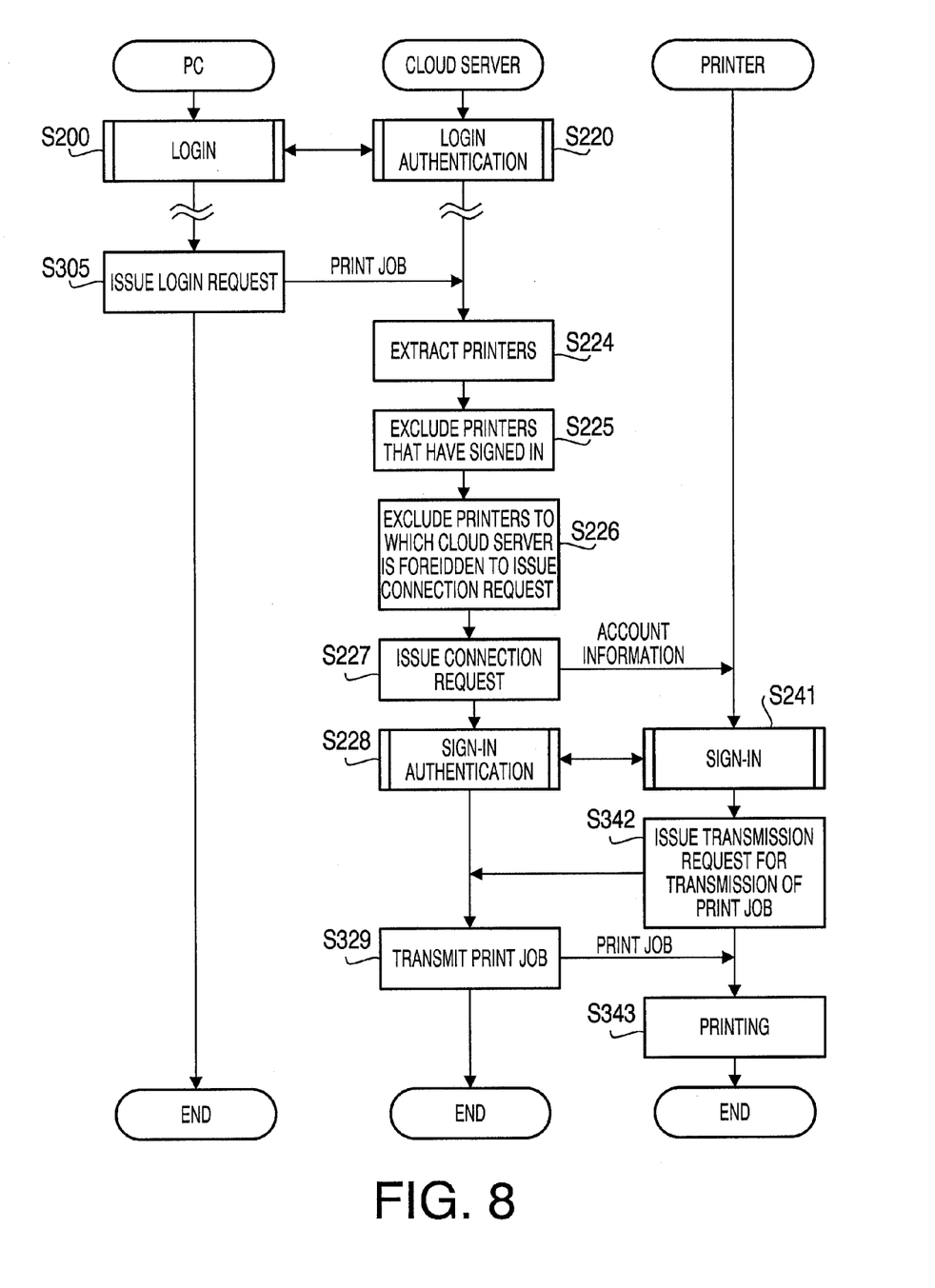
FIG. 8 is a flowchart showing a procedure of operations to be executed when a print job is transmitted from the PC to the printer via the cloud server in the image forming system of the embodiment according to one or more aspects of the present invention.

The subsequent processes, i.e., a sign-in process by the printer 100 (S241) and a sign-in authentication process by the cloud server 300 (S228) are the same as those shown in FIG. 7. Thus, even at the time of transmission of the print job, the user is allowed to utilize the printer 100 without having to make the printer 100 sign in on the cloud server 300 in the same manner as when the PC 200 logs in to the cloud server 300 (see FIG. 7).

When successfully signing in on the cloud server 300, the printer 100 begins to periodically issue to the cloud server 300 the transmission request (which requests the cloud server 300 to transmit the print job to the printer 100) (S342). Upon receiving the transmission request from the printer 100, the cloud server 300 searches a print job complying with the transmission request from the print buffer 545. When finding the print job complying with the transmission request, the cloud server 300 transmits the print job to the printer 100 (S329). Then, the printer 100, which has received the print job, performs printing based on the print job (S343). It is noted that, in S329, when a destination to which the print job is to be transmitted is a printer registered with the item "connection request" having the value "OFF," the cloud server 300 displays an error message without transmitting the print job.

As described above, when the connection request is issued at the time of transmission of the print job, it is possible to identify the printer specified by the print job, as a printer to which the connection request is to be issued. Thereby, it is possible to prevent a printer, which is not to perform printing, from signing in on the cloud server 300 in a more favorable manner than when the connection request is issued at the time of login. Meanwhile, when the connection request is issued at the time of login, it is possible to complete the sign-in process by the printer 100 more promptly and consequently obtain an intended printed material more promptly than when the connection request is issued at the time of transmission of the print job.

[Sign-Out]

Figure 9:
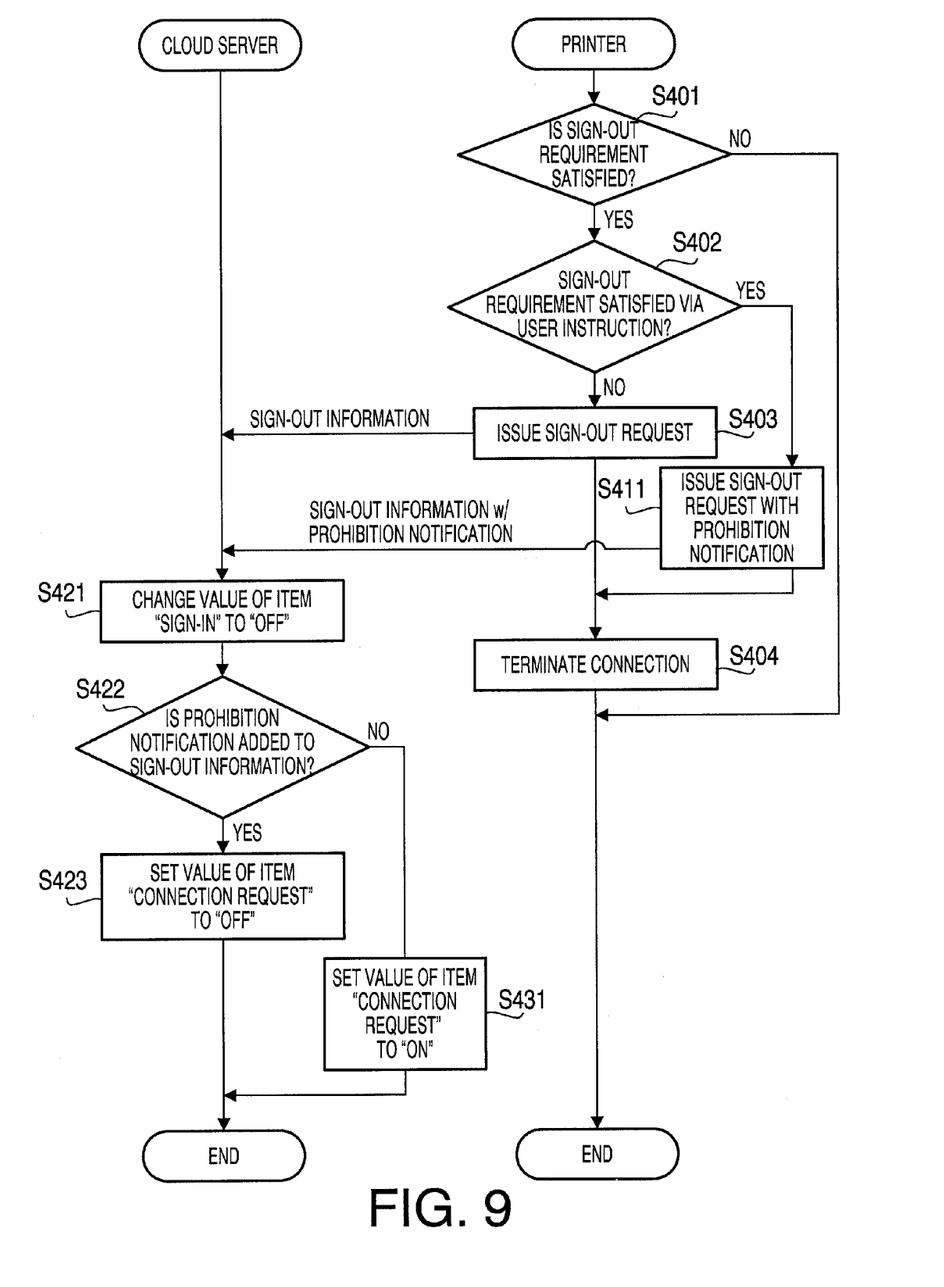
FIG. 9 is a flowchart showing a procedure of operations to be executed when the printer signs out from the cloud server in the image forming system of the embodiment according to one or more aspects of the present invention.

Subsequently, an explanation will be provided about operations to be executed when the printer 100, which has established the communication connection with the cloud server 300, signs out from the cloud server 300, with reference to FIG. 9.

When the printer 100 signs out from the cloud server 300, firstly, the printer 100 determines whether a sign-out requirement for the printer 100 to sign out from the cloud server 300 is satisfied (S401). The sign-out requirement may include a change in the status of the printer 100. For example, the sign-out requirement may include a requirement that the printer 100, when having a function to change its operational mode to a power-saving mode to reduce power consumption in a situation where the printer 100 has not received any print job or had any operation of the operation panel 40 for a predetermined time or more, has changed its operational mode to the power-saving mode.

Further, the sign-out requirement may include a requirement that the printer 100, when having a function to stop the periodic issuance of the transmission request in a situation where the printer 100 has not received any print job from the cloud server 300 for a predetermined time or more, has stopped the periodic issuance of the transmission request.

Further, the sign-out requirement may include a requirement that the printer 100, when having an operable member (such as a button) on the operation panel 40 to accept a sign-out request from the user, has accepted the sign-out request through the operable member.

When determining that the sign-out requirement is satisfied (S401: Yes), the printer 100 determines whether the satisfied sign-out requirement results from a user instruction (the sign-out requirement is satisfied via a user instruction) (S402). When determining that the satisfied sign-out requirement does not result from a user instruction (S402: No), the printer 100 issues a sign-out request to the cloud server 300 (S403). The sign-out request has sign-out information added thereto that includes the account information and the printer information.

Meanwhile, when determining that the satisfied sign-out requirement results from a user instruction (S402: Yes), the printer 100 transmits to the cloud server 300 a prohibition notification for changing the value of the item "connection request" for the printer 100 in the printer DB 541 of the cloud server 300 to "OFF" in addition to the sign-out request (S411).

After the printer 100 issues the sign-out request in S403 or S411, the communication connection is terminated (S404). Thereby, the printer 100 stops the periodic issuance of the transmission request that requests the cloud server 300 to transmit the print job. When determining that the sign-out requirement is not satisfied (S401: No), the printer 100 does not issue the sign-out request.

On the other hand, when receiving the sign-out request, the cloud server 300 changes the value of the item "sign-in" for the printer, which has issued the sign-out request, in the printer DB 541 to "OFF" (S421).

Next, the cloud server 300 determines whether the prohibition notification is added to the sign-out request (S422). When the prohibition notification is added to the sign-out request (S422: Yes), it is determined that the sign-out request has been issued at the user's discretion. Therefore, even though the printer 100 does not voluntarily sign in on the cloud server 300, the user is less likely to suffer unforeseen inconveniences. Rather, the user is not likely to wish the printer 100 to voluntarily sign in on the cloud server 300. Hence, the cloud server 300 sets the value of the item "connection request" for the printer 100 in the printer DB 541 to "OFF" (S423), such that the cloud server 300 is forbidden to issue the connection request to the printer 100.

Meanwhile, when the prohibition notification is not added to the sign-out request (S422: No), it is determined that the sign-out request has been issued at the discretion of the printer 100. Therefore, when the printer 100 is set to voluntarily sign in on the cloud server 300, it is more advantageous to the user. Hence, the cloud server 300 sets the value of the item "connection request" for the printer 100 in the printer DB 541 to "ON" (S431).

[Displaying of Printer List]

Figure 10:
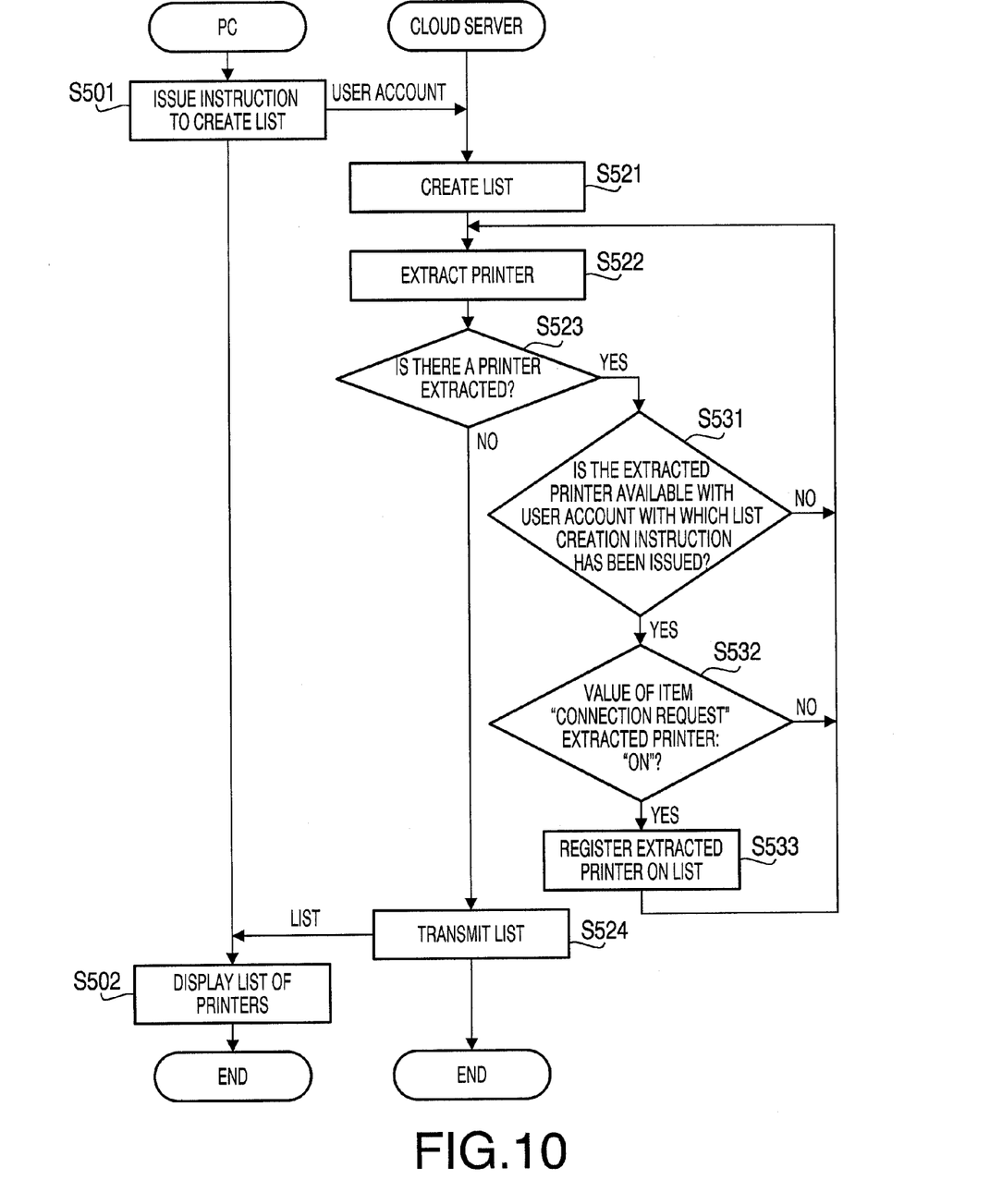
FIG. 10 is a flowchart showing a procedure of operations to be executed to display a list of available printers in the image forming system of the embodiment according to one or more aspects of the present invention.

Subsequently, an explanation will be provided about operations to be executed to display a list of available printers in the image forming system 900, with reference to FIG. 10.

In the process for displaying a list of available printers in the image forming system 900, firstly, the PC 200 transmits to the cloud server 300 a list creation instruction for instructing the cloud server 300 to create a list (S501). The list creation instruction may be transmitted, for instance, when the user issues to the PC 200 an instruction to search printers. The list creation instruction has the user account added thereto that is currently logging in to the cloud server 300.

Upon receipt of the list creation instruction, the cloud server 300 creates a list of printers (S521). The list is in an initial state where there is no printer registered, immediately after the list is created in S521.

Next, the cloud server 300 advances creation of the list in S522 and the subsequent steps. Specifically, firstly, the cloud server 300 extracts a single record for a printer from the printer DB 541 (S522). Printers to be extracted may include a printer that has established the communication connection with the cloud server 300 and a printer that has terminated the communication connection with the cloud server 300. Then, the cloud server 300 determines whether there is a record for a printer extracted in S522 (S523).

When determining that there is an extracted record for a printer (S523: Yes), the cloud server 300 determines whether the printer corresponding to the extracted record (hereinafter, which may simply be referred to as "the extracted printer") is available with the user account with which the list creation instruction has been issued (S531). Specifically, when the user account with which the list creation instruction has been issued belongs to a group account stored in association with the extracted printer, the printer is available with the user account. Meanwhile, when the user account with which the list creation instruction has been issued does not belong to a group account stored in association with the extracted printer, the printer is not available with the user account. When determining that the extracted printer is not available with the user account with which the list creation instruction has been issued (S531: No), the cloud server 300 does not register the printer extracted in S522 on the list, and then goes back to S522 to extract another record for a different printer.

When determining that the extracted printer is available with the user account with which the list creation instruction has been issued (S531: Yes), the cloud server 300 determines whether the value of the item "connection request" for the extracted printer is "ON" (S532). In other words, the cloud server 300 determines whether the cloud server 300 permits the extracted printer to perform operations for signing in on the cloud server 300. When the value of the item "connection request" for the extracted printer is "OFF" (S532: No), it is determined that the printer has signed out from the cloud server 300 in accordance with a user operation and is currently unavailable, and therefore, it is impermissible to make the printer sign in on the cloud server 300 without any user instruction. Hence, the cloud server 300 does not register the printer extracted in S522 on the list, and then goes back to S522 to extract another record for a different printer.

When determining that the value of the item "connection request" for the extracted printer is "ON" (S532: Yes), the cloud server 300 registers the printer extracted in S522 on the list created in S521 (S533). After execution of S533, the cloud server 300 goes back to S522 to extract another record for a different printer.

When determining that there is not an extracted record for a printer (S523: No), the cloud server 300 transmits the list at that time to the PC 200 (S524). Upon receipt of the list, the PC 200 displays printers registered on the list (S502).

The printers displayed in S502 include a printer which is not currently in the communication connection with the cloud server 300 but registered on the list as being allowed to establish the communication connection with the cloud server 300 in response to the cloud server 300 issuing the connection request. Thus, by acquiring the information of the printer DB 541 of the cloud server 300 and displaying the acquired information with the PC 200, the user is allowed to easily know all the available printers.

[Information to be Exchanged in Image Forming System]
Hereinafter, a summary will be provided about various kinds of information such as data and requests to be exchanged in the image forming system 900.

(1) Information to be Transmitted from Printer to Cloud Server
The printer 100 transmits to the cloud server 300 information such as the account information (which contains the group account and the password associated with the group account) entered in S101, the printer information (which contains the printer name and the IP address of the printer 100) in S102, the transmission request (which requests the cloud server 300 to transmit the print job to the printer 100) in S343, the sign-out information (which includes the account information and the printer information) in S403 or S411, and the prohibition notification in S411. Based on each of the above kinds of information, the cloud server 300 performs a corresponding process.

(2) Information to be Transmitted from Cloud Server to Printer
The cloud server 300 transmits, to the printer 100, the result of the sign-in authentication in S122, the connection request for sign-in (with the group account and the password associated with the group account added thereto) in S227, and the print job in S329. Based on each of the above kinds of information, the printer 100 performs a corresponding process.

(3) Information to be Transmitted from PC to Cloud Server
The PC 200 transmits, to the cloud server 300, the account information (the user account and the password associated with the user account) entered in S201, the print job (the print data to be printed, the printer settings, and the user account information) in S305, and the list creation instruction (to which the user account is added that is currently logging in to the cloud server 300) in S501. Based on each of the above kinds of information, the cloud server 300 performs a corresponding process.

(4) Information to be Transmitted from Cloud Server to PC
The cloud server 300 transmits, to the PC 200, the result of the login authentication in S222 and the list of printers in S524. Based on each of the above kinds of information, the PC 200 performs a corresponding process.

As described above in detail, upon receipt of the print request, the cloud server 300 of the embodiment issues the connection request to the printer 100 based on the device information. Then, even though the communication connection between the printer 100 and the cloud server 300 has been terminated, in response to detecting the connection request from the cloud server 300, the printer 100 reestablishes the communication connection with the cloud server 300 without having to accept any user operation. This procedure makes it possible to establish the communication connection between the printer 100 and the cloud server 300 without any user operation. Thus, it is possible to reduce user's efforts required for reestablishing the communication connection between the printer 100 and the cloud server 300.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]
The printer 100 exemplified in the aforementioned embodiments may be replaced with any other devices having an image processing functions such as an image scanner, a facsimile machine, a copy machine, and a multi-function peripheral. In addition, the PC 200 configured to transmit the print job to the printer 100 may be replaced with mobile devices such as smartphones.

In the aforementioned embodiment, the cloud server 300 receives the printer information from the printer 100, and stores the received printer information. However, in advance of the sign-in, the PC 200 may make the cloud server 300 store the printer information of the printer 100. Alternatively, the printer information may directly be input into the cloud server 300.

In the aforementioned embodiment, to establish the communication connection between the cloud server 300 and the printer 100, the sign-in authentication is performed with the password. However, aspects of the present invention may be applied to a system configured to establish the communication connection between the cloud server 300 and the printer 100 without the sign-in authentication. For example, the cloud server 300 may acquire information for identifying a printer and then issue the connection request to the printer identified by the acquired information. The same manner may apply to establishment of the communication connection between the cloud server 300 and the PC 200.

In the aforementioned embodiment, the account (in the embodiment, the group account) for establishing the communication connection between the cloud server 300 and the printer 100 is different from the account (in the embodiment, the user account) for establishing the communication connection between the cloud server 300 and the PC 200. However, the same account may be used for establishing the both communication connections.

In the aforementioned embodiment, the cloud server 300 issues the connection request to the printer identified by the group account or the user account. However, the cloud server 300 may issue the connection request to all the printers for which the records are stored in the printer DB 541. In this respect, nevertheless, it is noted that when the cloud server 300 issues the connection request to the printer identified by the group account or the user account as exemplified in the embodiment, it results in fewer wasteful operations.

In the aforementioned embodiment, when the cloud server 300 issues the connection request to the printer 100, the cloud server 300 also transmits the account information required for the sign-in. However, when the printer 100 stores the account information, the cloud server 300 may not need to transmit the account information. For example, by storing the account information entered in S101 into the NVRAM 34 of the printer 100, the operation of transmitting the account information in S227 may be omitted. In this respect, nevertheless, it is noted that when the cloud server 300 manages the account information, it is possible to reduce the risk that the account information might leak.

What is claimed is:

1. An image forming device comprising:
   a first establishment unit configured to:
      accept an entry of authentication information for enabling the image forming device to sign in on a server;
      transmit, to the server, a sign-in request comprising the accepted authentication information; and
      establish a connection with the server in response to receiving from the server an authentication result indicating that the image forming device has successfully signed in on the server;
   a termination unit configured to:
      upon receipt of a first sign-out instruction, transmit a first sign-out request to the server, wherein the first sign-out request includes a prohibition request to request that the server set a value of a connection request setting for the image forming device to OFF and to request that the server not transmit a connection request to the image forming device, and wherein the first sign-out request operates to terminate the connection between the first establishment unit and the server; and
      upon a particular period of time elapsing without receiving a job or receiving a first sign-out instruction, transmit a second sign-out request to the server, wherein the second sign-out request is transmitted without a prohibition request and wherein the second sign-out request operates to request that the server set the value of the connection request setting for the image forming device to ON and to terminate the connection between the first establishment unit and the server; and
   a second establishment unit configured to:
      after the termination unit has terminated the connection with the server via the second sign-out request, receive from the server a connection request having the authentication information added thereto; and
      in response to receiving the connection request from the server, transmit to the server the authentication information added to the connection request, and establish a connection with the server without requiring a re-entry of authentication information.

2. The image forming device according to claim 1, wherein the first establishment unit is configured to issue, to the server, a request for connection establishment to request the server to establish the connection, and
wherein the image forming device further comprises a transmission unit configured to transmit, to the server, device information for identifying the image forming device, before the termination unit terminates the connection with the server after the first establishment unit issues the request for connection establishment to the server.

3. The image forming device according to claim 2, wherein the transmission unit is configured to transmit, to the server, user information for identifying a user who has issued the request for connection establishment via the first establishment unit, in association with the device information, and
wherein a detector is configured to detect the connection request that is issued from the server to an image forming device associated with a user from whom the server has accepted a print-related request.

4. The image forming device according to claim 1, wherein the first establishment unit is configured to issue, to the server, a request for connection establishment to request the server to establish the connection,
wherein the image forming device further comprises a storage unit configured to store authentication information required for authentication necessary for establishing the connection between the server and the image forming device, before the termination unit terminates the connection with the server after the first establishment unit issues the request for connection establishment to the server, and
wherein the second establishment unit is configured to acquire the authentication information from the storage unit and establish the connection with the server using the authentication information.

5. The image forming device according to claim 1, wherein the first establishment unit is configured to issue, to the server, a request for connection establishment to request the server to establish the connection,
wherein the image forming device further comprises an authentication information transmitting unit configured to transmit, to the server, authentication information required for authentication necessary for establishing the connection between the server and the image forming device, before the termination unit terminates the connection with the server after the first establishment unit issues the request for connection establishment to the server, and
wherein the second establishment unit is configured to acquire the authentication information from the server and establish the connection with the server using the authentication information.

6. An image forming system comprising:
an information processing device;
an image forming device; and
a server configured to communicate with the information processing device and the image forming device, the server being configured to receive print data from the information processing device and transmit the received print data to the image forming device,
wherein the image forming device comprises:
   a first establishment unit configured to: accept an entry of authentication information for enabling the image forming device to sign in on the server;
   issue a sign-in request for connection establishment to the server, the sign-in request comprising the accepted authentication information; and
   establish a connection with the server in response to receiving from the server an authentication result indicating that the image forming device has successfully signed in on the server;
a termination unit configured to:

upon receipt of a first sign-out instruction, transmit a first sign-out request to the server, wherein the first sign-out request includes a prohibition request to request that the server set a value of a connection request setting for the image forming device to OFF and to request that the server not transmit a connection request to the image forming device, and wherein the first sign-out request operates to terminate the connection between the first establishment unit and the server; and upon a particular period of time elapsing without receiving a job or receiving a first sign-out instruction, transmit a second sign-out request to the server, wherein the second sign-out request is transmitted without a prohibition request and wherein the second sign-out request operates to request that the server set the value of a connection request setting for the image forming device to ON and to terminate the connection between the first establishment unit and the server;

a transmission unit configured to transmit, to the server, device information for identifying the image forming device, before the termination unit terminates the connection with the server after the first establishment unit issues the request for connection establishment to the server;

a detector configured to detect a connection request issued by the server; and a second establishment unit configured to establish a connection with the server in response to the detector detecting the connection request issued by the server, wherein the server comprises:

a server-side establishment unit configured to:
  receive, from the image forming device, a sign-in request comprising authentication information for enabling the image forming device to sign in on the server;
  perform an authentication operation based on the authentication information included in the received sign-in request; and
  establish a connection with the image forming device when the image forming device has successfully signed in on the server as a result of the authentication operation;

a server-side termination unit configured to:
  upon receiving the first sign-out request, which includes the prohibition request, set the value of the connection request setting for the image forming device to OFF and configure a setting in the server for not re-sending a connection request to the image forming device; and
  upon receiving the second sign-out request, which does not include the prohibition request, set the value of the connection request setting for the image forming device to ON and configure a setting in the server for re-sending a connection request to the image forming device;

a server-side storage unit configured to receive and store the device information for identifying the image forming device that is transmitted by the image forming device, before the server-side termination unit terminates the connection with the image forming device after the server-side establishment unit accepts the request for connection establishment from the image forming device;

a server-side acceptance unit configured to accept a print-related request via the information processing device; and a server-side issuance unit configured to issue the connection request having the authentication information added thereto, to the image forming device based on the device information stored in the server-side storage unit, in response to the server-side acceptance unit accepting the print-related request, the connection request having the authentication information added thereto, the added authentication information eliminating the need for re-entry of authentication information to enable server sign in by the image forming device.

7. The image forming system according to claim 6,
wherein the transmission unit of the image forming device is configured to transmit, to the server, user information for identifying a user who has issued the request for connection establishment via the first establishment unit, in association with the device information for identifying the image forming device,
wherein the detector of the image forming device is configured to detect the connection request that is issued from the server to a device associated with a user from whom the server-side acceptance unit has accepted the print-related request,
wherein the server-side storage unit is configured to receive the device information and the user information from the image forming device, and store the device information and the user information in association with each other, and
wherein the server-side issuance unit is configured to, when determining that the user who has issued the print-related request accepted by the server-side acceptance unit is identical to the user who has issued the request for connection establishment accepted by the server-side establishment unit, issue the connection request to an image forming device associated with the identical user.

8. The image forming system according to claim 6,
wherein the server further comprises a server-side transmission unit configured to transmit the device information stored in the server-side storage unit to the information processing unit, and
wherein the information processing device is configured to receive the device information from the server, and display an image forming device corresponding to the received device information.

9. An image forming device comprising:
an image forming unit configured to form an image on a sheet;
an operation panel configured to receive instructions from an user;
a network interface configured to communicate with the server; and
a controller configured to:
  in response to receiving an authentication information via the operation panel,
    send, to the server via the network interface, a sign-in request comprising the authentication information received via the operation panel,
  receive, from the server via the network interface, an authentication result indicating whether an authentication using the authentication information is successful or not,
  in a case that the received authentication result indicates that the authentication is successful, establish a connection with the server, and in a case that the received authentication result indicates that the authentication is unsuccessful, not establish a connection with the server; and in response to receiving an authentication information from the server via the network interface, send back, to the server via the network interface, the authentication information received from the server, and establish a connection with the server to which the authentication information has been sent; and the controller further configured to:

in response to receiving a first sign-out instruction via the operation panel, transmit a first sign-out request to the server via the network interface, wherein the first sign-out request includes a prohibition request to request that the server set a value of a connection request setting for the image forming device to OFF and to request that the server not transmit a connection request to the image forming device, and wherein the first sign-out request operates to terminate the connection between the server and the controller; and upon a particular period of time elapsing without receiving a job or receiving a first sign-out instruction, transmit a second sign-out request to the server, wherein the second sign-out request is transmitted without a prohibition request and wherein the second sign-out request operates to request that the server set the value of the connection request setting for the image forming device to ON and to terminate the connection between the server and the controller.

10. An image forming device comprising:

an image forming unit configured to produce an image, the image forming unit having a controller, the controller having a non-transitory computer-readable medium configured to store instructions operable by a processor to perform:

accepting an entry of authentication information to enable the image forming unit to sign on to a server;

transmitting a sign-in request to the server, the sign-in request comprising the entered authentication information;

receiving an authentication result from the server, the authentication result indicating the controller may successfully communicate with the server;

establishing a first communication with the server, transmitting a first sign-out request to the server upon receiving a first sign-out instruction, wherein the first sign-out request includes a prohibition request to request that the server set a value of a connection request setting for the image forming device to OFF and to request that the server not transmit a connection request to the image forming unit and wherein the first-sign out request operates to terminate the connection between the controller and the server;

transmitting a second sign-out request to the server upon a particular period of time elapsing without receiving a job or receiving a first sign-out instruction, wherein the second sign-out request is transmitted without a prohibition request and wherein the second sign-out request operates to request that the server set the value of the connection request setting for the image forming device to ON and to terminate the connection between the controller and the server;

after terminating the first communication with the server via the second sign-out request, receiving a connection request from the server, wherein the connection request from the server includes the previously entered authentication information;

in response to the connection request from the server and without re-entry of authentication to enable the image forming unit, transmitting a sign-in request to the server, the sign-in request comprising the entered authentication information;

receiving an authentication result from the server, the authentication result indicating the controller may successfully communicate with the server;

establishing a second communication with the server.

* * * * *